United States Patent [19]

Nakamura et al.

[11] Patent Number: 5,481,641

[45] Date of Patent: Jan. 2, 1996

[54] MOTOR CONTROL APPARATUS

[75] Inventors: Akihiko Nakamura, Osaka; Yoshio Sakakibara, Neyagawa; Makoto Gotou, Nishinomiya; Kazuhiko Kobayashi, Moriguchi, all of Japan

[73] Assignee: Matsushita Electric Industrial Co., Ltd., Osaka, Japan

[21] Appl. No.: 87,046

[22] Filed: Jul. 7, 1993

[30] Foreign Application Priority Data

Jul. 8, 1992 [JP] Japan ................................. 4-180847

[51] Int. Cl.$^6$ ........................................... H02P 5/00
[52] U.S. Cl. .......................... 388/800; 388/906; 318/798; 318/779; 318/799; 318/484
[58] Field of Search ................................. 388/800, 906; 318/798, 779, 799, 484

[56] References Cited

U.S. PATENT DOCUMENTS

| 4,568,193 | 2/1986 | Contri et al. ............................. 388/800 |
| 4,885,515 | 12/1989 | Kurakake et al. ...................... 388/800 |
| 5,159,218 | 10/1992 | Murry et al. ............................. 388/800 |

FOREIGN PATENT DOCUMENTS

| 0163328 | 12/1985 | European Pat. Off. . |
| 56-046680 | 4/1981 | Japan . |
| 61-88783 | 5/1986 | Japan . |
| 61-266079 | 11/1986 | Japan . |
| 62-089487 | 4/1987 | Japan . |

Primary Examiner—Jonathan Wysocki
Assistant Examiner—Karen Masih
Attorney, Agent, or Firm—Wenderoth, Lind & Ponack

[57] ABSTRACT

A control apparatus for controlling a motor includes: a command unit for generating a command signal including a running command signal and a stopping command signal; a rotation sensor for generating an AC signal having a period corresponding to a rotational speed of the motor; a speed detector for detecting a rotational speed of the motor from the AC signal generated by the rotation sensor; a compensator for generating a control signal for controlling the motor, and a driver for driving the motor in response to the control signal generated by the compensator. The compensator includes: a time measuring unit for generating a detection timing signal at predetermined time intervals when the detected signal from the speed detector is not inputted; a control signal renewal unit for changing the control signal by a predetermined amount in response to the detection timing signal of the time measuring unit to generate a new control signal; a memory for storing a value in response to the control signal from the control signal renewal unit as a memory value; a rotation error generator for generating a rotation error in response to the detected signal from the speed detector, and a control signal generator for generating the control signal by adding the memory value stored in the memory to the rotation error as an adding signal, and if the detected signal from the speed detector is not inputted, the control signal is changed in a step-by-step manner by the time measuring unit and the control signal renewal unit.

10 Claims, 6 Drawing Sheets

MOTOR CONTROL APPARATUS

BACKGROUND OF THE INVENTION

1. Field of the Invention

This invention relates to a motor control apparatus for controlling a motor.

2. Description of the Prior Art

A motor control apparatus in which a rotational speed of the motor is detected to control the electrical power supplied to the motor in response to the detected signal thus obtained has been widely applied to a capstan motor or the like of a video tape recorder (hereinafter abbreviated as a VCR).

On the other hand, VCR units are always required to be reduced in size and weight. In order to meet these requirements, miniaturization of the mechanism has progressed. For this, the capstan motor is downsized as well, and the moment of inertia largely reduced. The reduction of the moment of inertia of a motor may result in a degradation in control performance. A control apparatus which reduces the rotational speed variation of such a motor has been investigated previously. For example, an iterative control method using a memory is disclosed in Japanese Laid-Open Patent Application No.5-10032. According to this method, the speed variation for any disturbance torque which is an integral number of times a specific frequency can be largely reduced. In addition, control methods using a disturbance observer have been proposed. The use of the disturbance observer makes it possible to reduce the speed variation for the disturbance torque at low frequency.

However, previous investigations were made mainly on how to reduce the rotational speed variation under a steady-state condition, and detailed investigations were not made on the operational process of the motor from the starting to the steady-state condition. Here, a general method of starting a conventional motor will be explained. Recently, VCR and the like have been frequently controlled by software using a microprocessor, however, the speed control is generally carried out at a time point when a detected signal of the rotational speed is inputted. As a result, if the motor is stopped and a detected speed signal is not inputted, the speed control is not carried out. As a result, in general, time measurement is carried out using a timer, and when the detected speed signal is not inputted for a predetermined time interval, a speed control is carried out so that the motor generates the maximum acceleration which is determined in accordance with the specification of the motor. Such a process is hereinafter called maximum acceleration processing. And, if the speed detection was made, a speed error is calculated from the speed detected signal and a control signal of the motor is generated so as to be proportional to the speed error. In addition, in order to suppress the steady-state speed deviation, an integral compensator is provided through which the speed error is integrated and a signal proportional to the value thus obtained is added thereto.

Then, in the VCR case, it is necessary to realize special reproducing functions in addition to the normal recording and reproducing functions. Typical one of the special reproducing functions is a slow reproduction function. Here, with the VCR performing multi-segment recording (for example, the digital VCR having an increased information amount, in order to perform the slow reproduction, a method will be considered in which a tape is run intermittently every one frame (or every one field). In this case, a method is used in which the tracking of a recording track and the head is not performed and the data is reproduced by scanning the same track several times. Namely, the tape is intermittently run at a low speed. In this case, however, if a motor of low inertia is run intermittently at a low speed under the large load condition, the speed control operation will become unstable with the methods shown above.

Since the response frequency of the the integral compensator cannot be set high to secure the stability of the control system, the time required for the response to converge becomes long. Accordingly, the integral compensator has no effect when starting the motor. By the maximum acceleration processing when starting the motor as shown above, the generated acceleration is large due to the fact that the moment of inertia of the motor is small and as a result, the rotational speed of the motor reaches the targeted value before the speed is detected (the speed detection is performed such that the motor is rotated for a constant time interval and the time required therefor is measured). In this case, the speed error becomes zero, and if the integrator is not provided, the control signal outputted from the control apparatus becomes one equivalent to the torque-off condition. In such case, if the load applied to the motor is large, the motor will be stopped. In addition, if the maximum acceleration processing is performed, the motor is operated so as to be intermittently started and stopped, resulting in the vibratory condition.

SUMMARY OF THE INVENTION

An object of this invention is to provide a motor control apparatus capable of obtaining a stable starting characteristic even when a motor having a low moment of inertia is to be run at a low speed.

In order to attain the object, a motor control apparatus of this invention comprises: a command means for generating a command signal including a running command signal and a stopping command signal; a rotation sensor means for generating an AC signal having a period corresponding to a rotational speed of the motor; a speed detection means for detecting a rotational speed of the motor from the AC signal generated by the rotation sensor means and for outputting a detected signal indicating the detected rotational speed; a compensation means for generating a control signal for controlling the motor, and a driver means for driving the motor in response to the control signal generated by the compensation means. The compensation means comprises: a stopping signal generating means for generating a signal to stop the motor when the command signal from the command means is the stopping command signal; a time measuring means for generating a detection timing signal at predetermined time intervals when the detected signal from the speed detection means is not inputted after the command signal from the command means has been switched from the stopping command signal to the running command signal; a control signal renewal means for changing the control signal by a predetermined amount in response to the detection timing signal from the time measuring means to renew the control signal in a step-by-step manner when the time measuring means is generating the detection timing signal; and a control signal generating means operable when the detected signal from the speed detection means is inputted thereto for generating said control signal in response to the detected signal from the speed detection means, the control signal generating means using an output of the control signal renewing means as an initial value of the control signal.

With the arrangement as shown above, an optimum control signal to start the motor can be searched, and, an optimum torque can be provided when starting the motor, so that a stable starting operation can be provided.

In addition, it is preferable that the arrangement shown above includes a memory for storing the control signal from the control signal renewal means as a memory value and the control signal generating means generates the control signal by adding the memory value from the memory to the rotation error.

Consequently, compensation for steady-state load can be achieved even just after detecting the speed of the motor, so that a stable starting of the motor can be provided even when the load is large and the steady-state speed deviation is large.

DESCRIPTION OF THE PREFERRED EMBODIMENTS

Figure 1:
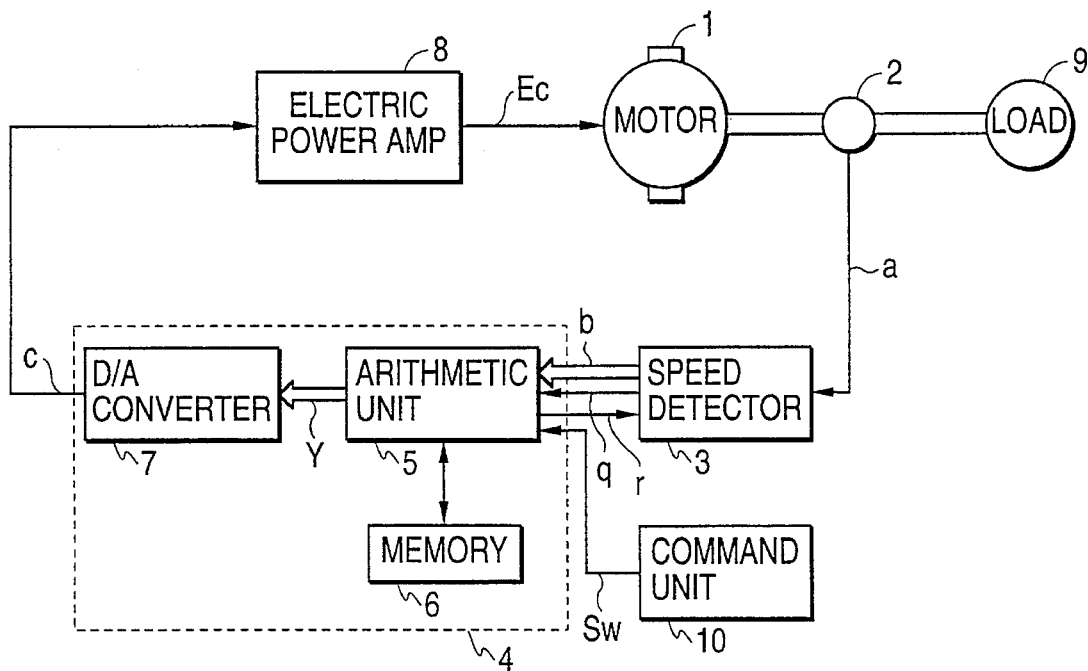
FIG. 1 is a block diagram of a motor control apparatus according to one embodiment of this invention.

FIG. 1 is a block diagram of a motor control apparatus according to one embodiment of this invention. Explanations follow on a method of controlling a rotational speed of the motor shown in FIG. 1 while referring to FIG. 1. In FIG. 1, a DC motor 1 directly drives a rotation sensor 2 and a load 9 to be rotated. The rotation sensor 2 generates an AC signal a of Zq cycle (Zq is any integer larger than one, Zq being=1000 in this embodiment) every one complete rotation of the motor 1. The AC signal a generated by the rotation sensor 2 is supplied to a speed detector 3 to obtain a digital signal b in response to a period of the AC signal a.

Figure 2:
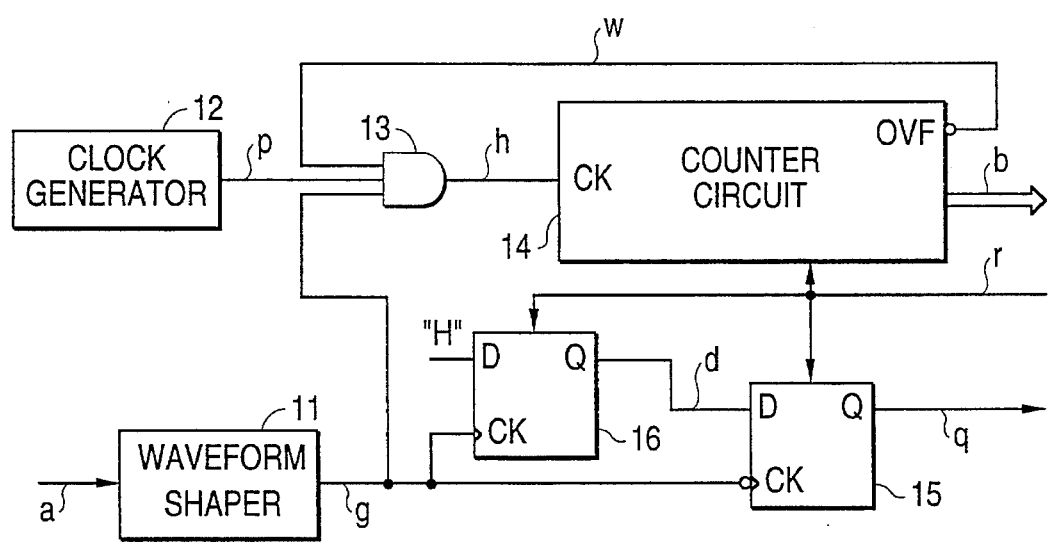
FIG. 2 is a block diagram of the speed detector shown in FIG. 1.

FIG. 2 is a block diagram of a concrete example of the speed detector 3 shown in FIG. 1. The AC signal a is waveform-shaped by a waveform shaper 11 to obtain a shaped signal g. The shaped signal g is delivered to an AND circuit 13, a flip-flop circuit 15 and a flip-flop circuit 16. The AND circuit 13 is also supplied with a clock pulse p of a clock generator 12 and an overflow output signal w of a counter circuit 14. The clock generator 12 consists of a quartz-crystal oscillator, a frequency divider and the like to generate a clock pulse signal having a much higher frequency (as high as about 500 kHz) than that of the shaped signal g. The counter circuit 14 is a 12-bit up-counter which receives an output pulse signal h of the AND circuit 13 to count up the content thereof. Also, the overflow output signal w is of a high potential level (hereinafter abbreviated as "H") when the content thus counted-up does not exceed a predetermined value and changed to the signal of a low potential level (hereinafter abbreviated as "L") when it exceeds the predetermined value. The flip-flop circuit 16 of a data input type receives the signal of "H" through its data input terminal with the leading edge of the shaped signal g as a trigger signal to make its output signal d an "H" level (d="H"). The flip-flop circuit 15 of the data input type receives the signal d through its data input terminal with the trailing edge of the shaped signal g as a trigger signal to make its output signal q an "H" level (q="H") if d="H". In addition, if a reset signal r of a compensator 4 becomes "H", the internal conditions of the counter circuit 14, the flip-flop circuit 15 and the flip-flop circuit 16 are reset (b="LLLLLLLLLLLL", w="H", q="L" and d="L").

Here, suppose that the counter circuit 14, the flip-flop circuit 15 and the flip-flop circuit 16 are being reset by the reset signal r. When the AC signal a of the rotation sensor 2 is changed in level from "L" to "H", the shaped signal g of the waveform shaping circuit 11 is changed in level from "L" to "H", and the clock pulse signal p of the clock generator 12 is outputted as the output signal h of the AND circuit 13. The counter circuit 14 counts the output signal h to change the internal condition thereof. The flip-flop circuit 16 receives the data "H" through the leading edge of the shaped signal g to change the output signal d thereof from "L" to "H". If the AC signal a is changed in level from "H" to "L", the shaped signal g of the waveform shaper 11 is changed in level from "H" to "L", and the output signal h of the AND circuit 13 becomes "L", so that the counter circuit 14 maintains the internal condition thereof. On the other hand, the flip-flop circuit 15 receives the signal d through the trailing edge of the shaped signal g. In this case, the signal d becomes an "H" when received through the leading edge of the shaped signal g, so that the output signal q of the flip-flop circuit 15 is changed in level from "L" to "H". The digital signal b of the counter circuit 14 has a value proportional to the half period length of the AC signal a of the rotation sensor 2 and inversely proportional to the rotational speed of the motor 1.

The compensator 4, which will be described latter, receives the digital signal b of the counter circuit 14 when the output signal q of the flip-flop circuit 15 becomes an "H" level, and makes the reset signal r an "H" level for a predetermined short period of time to reset the counter circuit 14, the flip-flop circuit 15 and the flip-flop circuit 16 to the initial conditions in order to do the speed detection successively. Also, when the rotational speed of the motor 1 is excessively small, the period of the AC signal a of the rotation sensor 2 becomes long, so that the internal condition of the counter circuit 14 becomes larger than a predetermined value and the overflow output signal w is changed in level from "H" to "L" and the output signal h of the AND circuit 13 becomes an "L" level and as a result, the counter circuit 14 keeps its predetermined value.

A command unit 10 shown in FIG. 1 generates a command signal Sw for commanding the motor 1 to be stopped and run. In this embodiment, when Sw="L", it is a stopping command signal and when Sw="H" it is a running command signal The compensator 4 comprises an arithmetic unit 5, a memory 6 and a D/A converter 7 When Sw="H" the digital signal b of the speed detector 3 is processed through a built-in program described later to generate a control signal Y. The control signal Y thus generated is sent to the D/A converter 7 to be converted into an analog signal and outputted as a control signal c. The control signal c of the compensator 4 is sent to an electrical power amplifier 8 (driving circuit) to be subjected to electrical power amplification to generate a driving signal Ec which is an electric current which is proportional to the control signal c. The driving signal Ec is supplied to the motor 1. On the other hand, when Sw="L", the compensator 4 operates so as to output a control signal c that makes the motor 1 stop, which is a signal to make the driving signal Ec equal to zero. As a result, the speed control system in this embodiment comprises the command unit 10, the motor 1, the rotation sensor 2, the speed detector 3, the compensator 4 and the electrical power amplifier 8 (driving circuit); the rotational speed of the motor 1 is controllable to a predetermined value.

The memory 6 of the compensator 4 is separated into two parts consisting of a read only memory (ROM) range part in which a predetermined program and constant are stored and a random access memory (RAM) range in which values are stored at any time when necessary. The arithmetic unit 5 serves to do predetermined actions and operations in accordance with a program stored in the ROM range.

Now, if the rotational speed of the motor 1 is excessively low, the counter circuit 14 may keep the predetermined value. In this case, however, it becomes impossible to obtain a precise one-to-one correspondent relationship between the rotational speed and a speed error. In addition, when starting the motor 1 (just after the command signal Sw has been changed in level from "L" to "H"), if a torque necessary to start the motor is not generated, the motor remains stopped and the output signal q of the flip-flop 15 does not become an "H" level, so that the compensator 4 cannot be operated. Therefore, in general, the arithmetic unit 5 measures the time by means of a software timer realized by the program of the ROM range of the memory 6 and when the output signal q of the flip-flop circuit 15 does not become an "H" level in a specified period of time, a predetermined process is performed to generate the control signal c, which is described in detail latter. In this case, the specified period of time is determined depending on the rotational speed of the motor 1 and the number of AC signals generated by the rotation sensor 2 per one complete rotation of the motor 1. After the control signal c that accelerates the speed forcibly has been outputted, if the output signal q of the flip-flop circuit 15 become an "H" level in the specified period of time, the speed detection is carried out to generate the control signal c in response to the speed thus detected.

Figure 3:
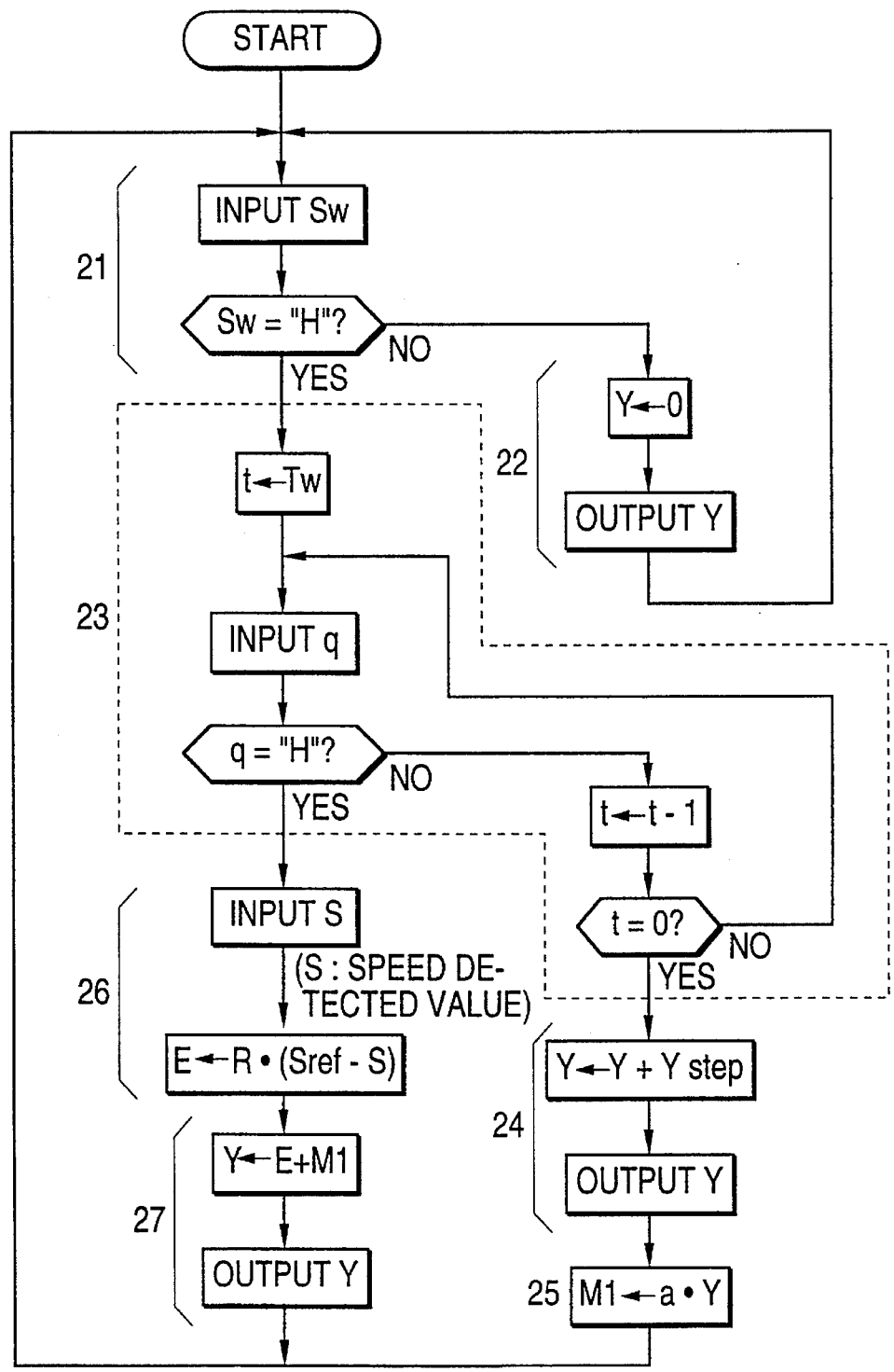
FIG. 3 is a flowchart showing one example of a program built in a compensator according to this invention.

FIG. 3 shows an example of the program stored in the ROM range of the memory 6 of the compensator 4 shown in FIG. 1. The operation thereof will be explained in detail below. The step numbers shown below correspond to the reference numerals shown in FIG. 3.

Step 21: Command signal input step

The command signal Sw is inputted. In a general VCR, the command signal is generated in a system control unit in response to a signal key-inputted. When Sw="L", the stopping command signal is generated to carry out the operation of Step 22, and when Sw="H", the running command signal is generated to carry out the operation of Step 23.

Step 22: Stopping command signal generation step

The control signal Y for stopping the motor 1 is generated, which corresponds to the torque-off condition (Y+0). Then, the control signal Y is sent to the D/A converter 7 to be converted into a DC voltage signal (control signal) in response to the value of the signal Y. Thereafter, the operation of Step 21 is carried out.

Step 23: Time measuring step

The time Tw (detection timing signal) determined by a reference rotational speed is set in a timer (t←Tw). In general, this time Tw is set in the timer so as to be equal to or more than twice the time interval at which the rotational speed of the motor is detected when the motor is being rotated at the reference speed. And, the output signal q of the flip-flop circuit 15 of the speed detector 3 is inputted until the signal q becomes an "H" level. Namely, the speed detector 3 detects the half period of the AC signal a to monitor that a new digital signal b has been outputted. During that time, the timer is operated (t←t−1), and when the signal q does not become an "H" level before t=0, the operation of Step 24 is carried out, and when it becomes an "H" level before t=0, the operation of Step 26 is carried out.

Step 24: Control signal renewal step

The control signal Y outputted at the preceding running time is changed by a specific value Ystep (Y←Y+Ystep). For example, suppose that the control signal Y is changed through the command unit from the stopping command one to the running command one and Y+Ystep is provided after the time Tw has passed. Here, the polarity of Ystep is selected so as to generate a control signal Y that accelerates the rotation of the motor. Referring to the value of Ystep, if it is excessively large, a rapid acceleration results, as in conventional systems. On the other hand, if it is excessively small, the time necessary to start the motor becomes long. In general, the torque loaded to the motor can be estimated to be a certain amount, and if the value of Ystep is set so as to be ranged from a quarter to one-tenth the minimum value of the loaded torque thus estimated, the motor can be started without any problem arising. In this case, however, when the overshoot of the speed just after starting is intended to be small, the value of Ystep may be made as small as possible. Finally, it is satisfactory if such a control signal value Y that provides an excessive acceleration torque to the motor is not generated.

Then, the control signal Y is sent to the D/A converter 7 to be converted into a DC voltage (control signal) in response to the value of the control signal Y.

Step 25: Memory step (generation step of adding signal)

A valueα. Y (α is a predetermined constant) proportional to the control signal Y generated through the control signal renewal step is stored into the memory (M1 ←αY). The memory value M1 stored at this step is employed in the operation of Step 27 in the case when the speed could be detected. Thereafter, it is fed back to the operation of Step 21.

Just after the command signal Sw was changed in level from "L" to "H", namely, when starting the motor, the torque-up operations from Step 23 to step 25 are iterated in a step-by-step manner. And when the motor was started to be rotated and the speed detection could be made, Step 26 and the following steps may be operated. In this case, the value in response to the control signal when the motor is started to be rotated is stored in the memory as the memory value M1.

Step 26: Rotation error calculation step

At this step, the digital signal b of the speed detector 3 is read to obtain a speed detected value S (digital value) in response to the digital signal b, and at the same time, the reset signal r is made an "H" level for a predetermined period of time to reset the counter circuit 14 and the flip-flop circuit 15 of the speed detector 3 (the operations on the reset signal r are not shown in the flow diagram). The speed detected value S is subtracted from a predetermined reference value Sref and the value thus obtained is multiplied by a factor R (R is a specific positive constant); thus a rotation error E at the present time point of the motor is calculated (E=R.(Sref-S)).

Step 27: Control signal generation step

The memory value M1 (adding signal) written in the memory in the operation of Step 25 is added to the rotation error E to obtain the control signal Y (Y←E+M1).

The control signal thus obtained is supplied to the D/A converter 7 to be converted into a DC voltage signal (control signal) in response to the value of the control signal Y. Thereafter, it is fed back to the operation of Step 21.

With the structure as shown above, the acceleration torque is increased with the time when starting the motor and the necessary torque can be searched in a closed-loop manner, so that a suitable acceleration torque to be responded to the loaded torque when starting the motor can be outputted. That is, a problem does not occur in which the motor is rapidly accelerated and increased the speed excessively by applying a full-acceleration torque command signal as with conventional systems, and the rotational speed of the motor 1 gradually approaches the reference rotational speed and just after entering into the normal speed control loop (indicating the operations of Steps 21, 23, 26 and 27 shown in FIG. 3), the rotational speed of the motor is suitably smaller than the reference rotational speed and the control signal becomes an acceleration command, so that the motor is not stopped.

Figure 4A:
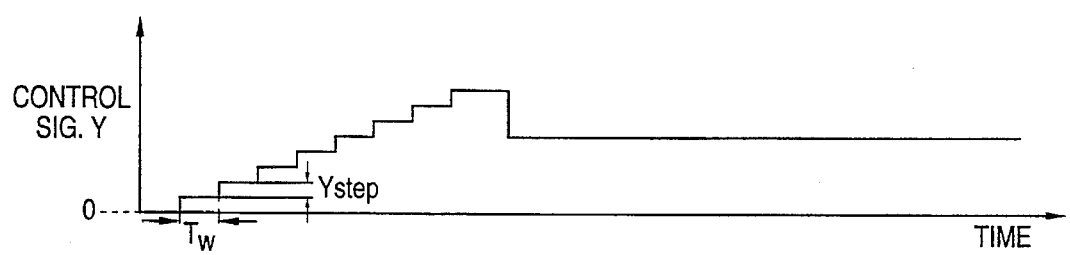
FIG. 4(a) is a diagram showing the change of an output of a control signal of a compensator with time according to one embodiment of this invention.
Figure 4B:
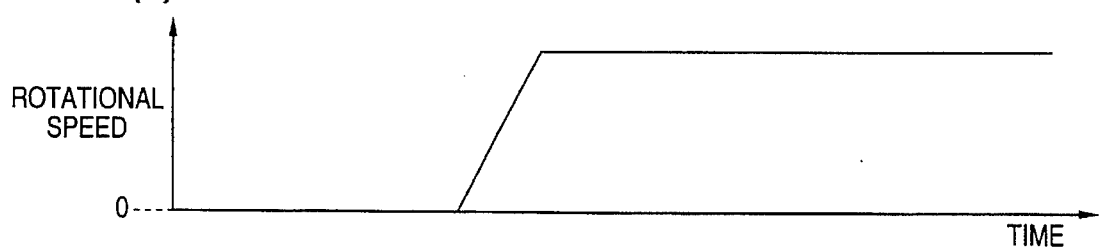
FIG. 4(b) is a diagram showing the change of a rotational speed of a motor with time according to one embodiment of this invention.

In addition, if entering into the normal speed control loop, the loaded torque is compensated for by adding the memory value M1 as the adding signal to the control signal Y and as a result, a stable rotational speed control can be realized. Therefore, the steady-state deviation can be suppressed by this operation. It is ideally preferable that the adding signal is coincided in value with the direct component of a load. In this case, if the direct load applied to the motor is known in advance, the specific value of the adding signal shown above can be determined. However, when considering the load fluctuations due to mechanism variations and the like, it is impossible to determine the specific value of the adding signal. As a result, if the adding signal is determined as in this embodiment, no influence due to load fluctuation results. In general, as the proportional constant $\alpha$ when the control signal of the control signal renewal unit is stored as the memory value M1, $\alpha$=1 can be selected satisfactorily, and if the control signal and the steady-state load response when the speed was detected are known in advance, a more suitable value can be selected as the proportional constant $\alpha$. FIGS. 4(a)–4(b) show how the control signal and the rotational speed of the motor are changed with respect to time.

In addition, the operation of the memory unit is carried out at each time when the control signal is generated by the control signal renewal unit in this embodiment, but it may be carried out at such a timing that the adding signal is generated in response to the control signal when the motor is started to be rotated, being needless to say that such case is within the scope of this invention.

Figure 5:
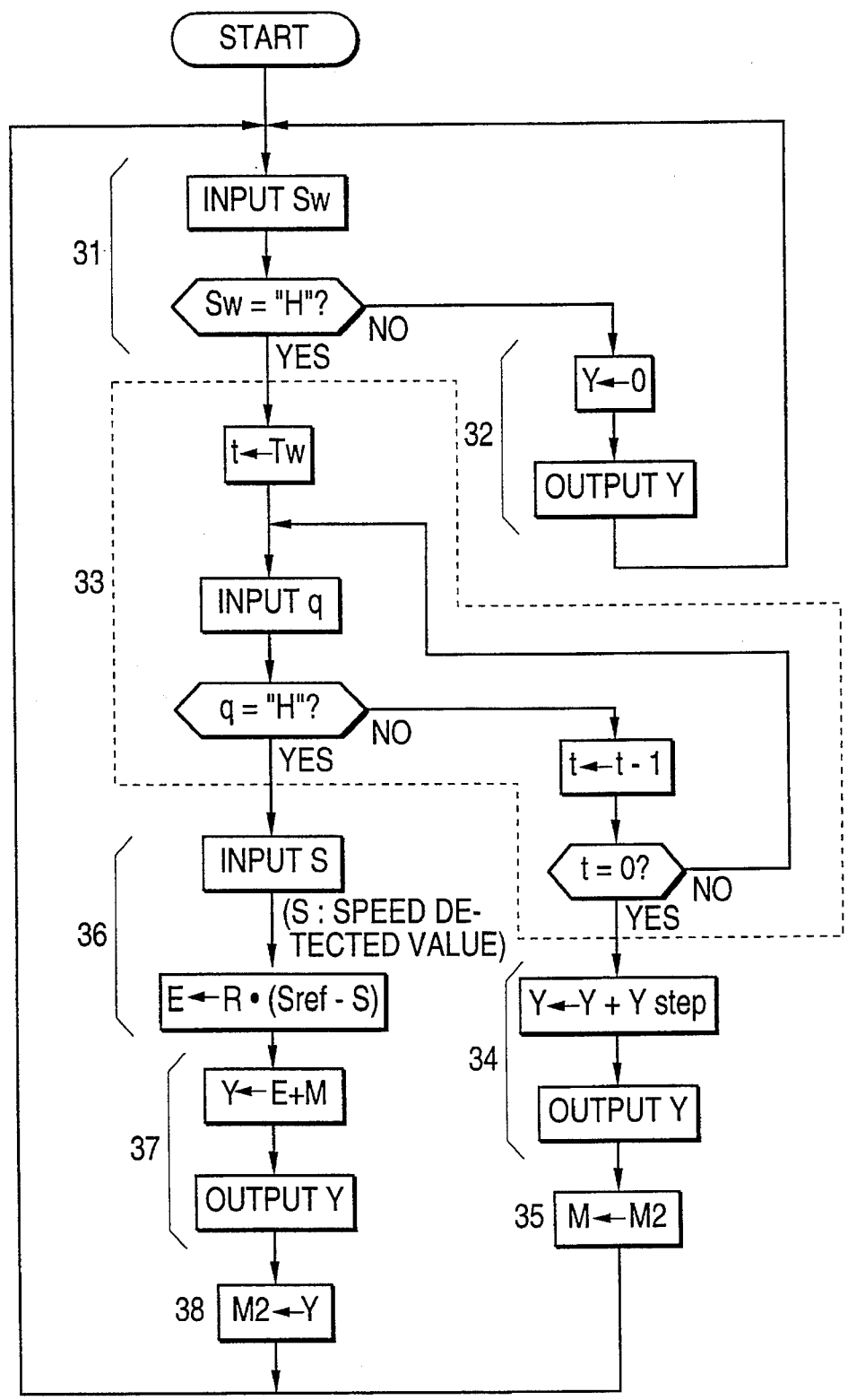
FIG. 5 is a flowchart showing another example of a program built in the compensator of this invention.

Next, an example of further improving the starting characteristic of the motor when running intermittently is shown in FIG. 5, which is formed adapted to provide a more stable starting characteristic in the case that stopping and running are continuously iterated. The operation thereof will be explained below.

Step 31: Command signal input step

The command signal Sw is inputted. In a general VCR, the command signal is generated in the system control unit in response to a signal key-inputted. When Sw="L", the stopping command signal is generated to carry out the operation of Step 32, and when Sw="H", the running command signal is generated to carry out the operation of Step 33.

Step 32: Stopping command signal generation step

The control signal Y that steps the motor 1 is generated, which corresponds to the torque-off condition (Y←0). Then, the control signal Y is sent to the D/A converter 7 to be converted into a DC voltage signal (control signal) in response to the value of the signal Y. Thereafter, the operation of Step 31 is carried out.

Step 33: Time measuring step

The time Tw (detection timing signal) determined by the reference rotational speed is set in the timer (t←Tw). In general, this time Tw is set in the timer so as to be more than twice the time interval at which the rotational speed of the motor is detected when the motor is being rotated at the reference speed. And, the output signal q of the flip-flop circuit 15 of the speed detector 3 is inputted until the signal q becomes an "H" level. Namely, the speed detector 3 detects the half period of the alternate current signal a to monitor that a new digital signal b is outputted. During that time, the timer is operated (t←t−1), and when the signal q does not become an "H" level before t= 0, the operation of Step 34 is carried out, and when it becomes an "H" level before t=0, the operation of Step 36 is carried out.

Step 34: Control signal renewal step

The control signal Y outputted at a preceding running time is changed by a specific value Ystep (Y←Y+Ystep). For example, suppose that the control signal Y is changed through the command unit from the stopping command one to the running command one and Y←Ystep is provided after the time Tw has passed. Here, the polarity of Ystep is selected so as to generate a signal that accelerates the rotation of the motor.

Furthermore, the control signal Y is sent to the D/A converter 7 to be converted into a DC voltage signal (control signal) in response to the value of the signal Y.

Step 35: Adding signal generation step

The adding signal M is generated from the memory value M2 stored through the operation of Step 38 (the details of which will be described later) when rotating under the steady-state condition with the command signal Sw="H" at the preceding running time (namely, when iterating the operations of Steps 31, 33, 36, 37 and 38, hereinafter called preceding steady-state running period of time) (M ←M2). The adding signal generated at this step is employed in the operation of Step 37 in the case when the speed could be detected. Thereafter, it is fed back to the operation of Step 31.

Just after the command signal Sw was changed in level from "L" to "H", namely when starting the motor, the torque-up operations from Step 33 to Step 35 are repeated in a step-by-step manner. And when the motor is started to be rotated and the speed detection could be made, Step 36 and the following steps may be operated. In addition, the adding signal M is generated in response to the memory value stored in the operation of the preceding steady-state running period of time.

Step 36: Rotation error calculation step

The digital signal b of the speed detector 3 is read to obtain the speed detected value S (digital value) in response to the digital signal b, and at the same time, the reset signal r is made an "H" level for a predetermined period of time to reset the counter circuit 14 and the flip-flop circuit 15 of the speed detector 3. The speed detected value S is subtracted from the predetermined reference value Sref and the value thus obtained is multiplied by a factor R (R is a specific positive constant); thus, the rotation error E at the present time point of the motor is calculated (E=R.(Sref-S)).

Step 37: Control signal generation step

The adding signal M generated in the operation of Step 35 is added to the rotation error E to obtain the control signal Y (Y←E+M).

The control signal Y thus obtained is supplied to the D/A converter 7 to be converted into a DC voltage signal (control signal) in response to the value of the signal Y.

Step 38: Memory step

The control signal Y is stored as a memory value thereof (M2←Y). The memory value stored at this step is employed in order to generate the adding signal at the next running time after stopping. It is fed back to the operation of Step 31.

With the structure as shown above, the adding signal to be added at the control signal generation step is very near in value to the steady-state load. This is because the load under the steady-state condition at the present time point and the load under the steady-state running condition at the preceding time point (especially just before being stopped) do not have very different DC components. That is, even just after starting the motor, the compensation for the steady-state speed deviation can be made by using an optimum adding signal and as a result, the starting characteristic can be improved. Especially, it is effective when the value of the steady-state load cannot be estimated due to mechanism variation and the like, when the load torque when starting and the steady-state load torque are largely different from each other, and when the correlation between these load torques is not clear.

In addition, in this embodiment, the operation of Step 38 is carried out each time that the speed detected signal is received and the operation of Step 35 is carried out each time that the control signal is generated through the operation of the control signal renewal Step 34, however, it may be carried out at such a timing that the control signal of the preceding steady-state running period of time is written in the memory and the value thus written can be employed as the adding signal after the speed was detected, being needless to say that such case is within the scope of this invention.

Figures 6, 7:
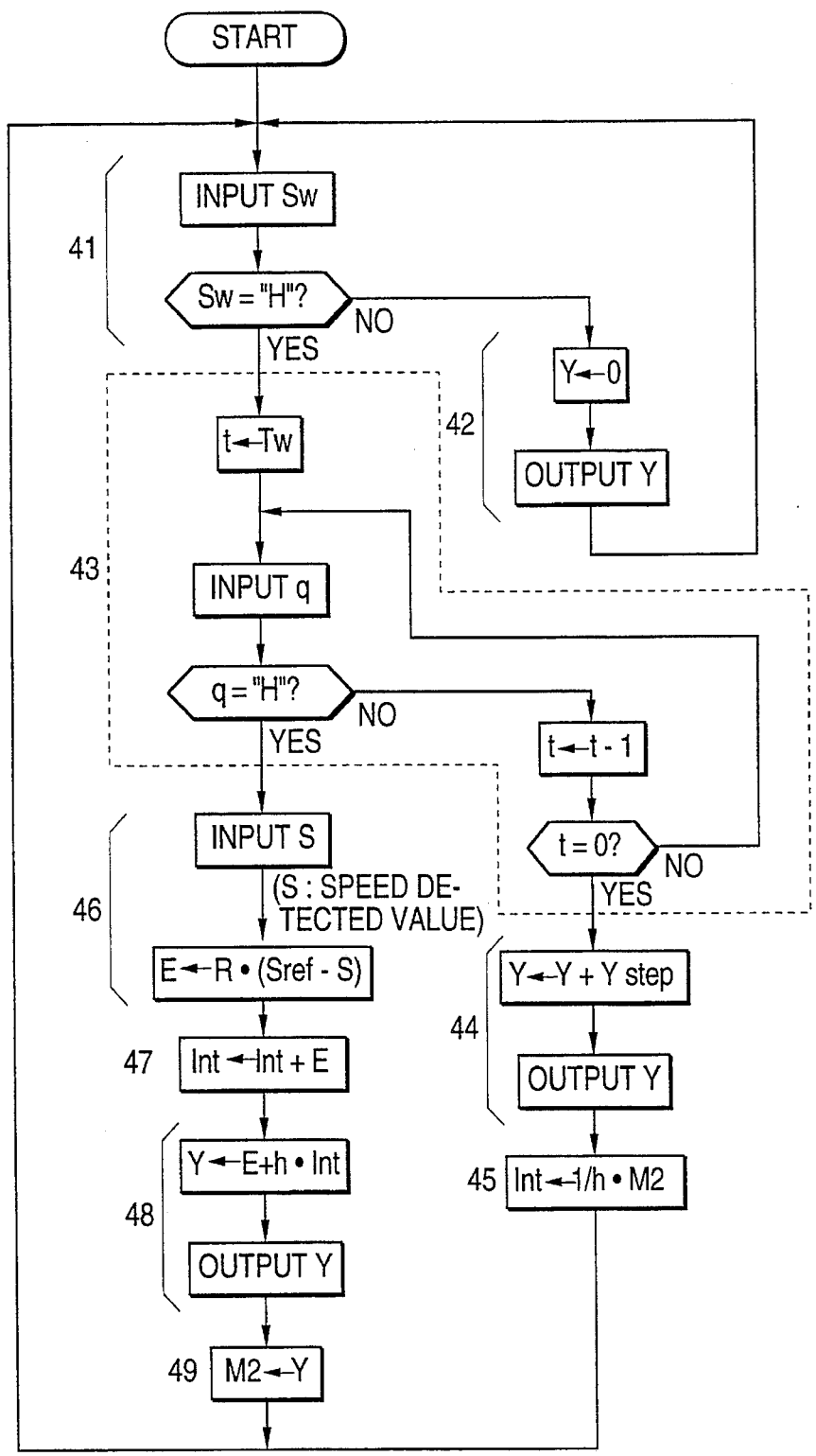
FIG. 6 is a flowchart showing still another example of a program built in the compensator of this invention.
FIG. 7 is a flowchart showing yet another example of a diagram built in the compensator of this invention.

FIG. 6 shows an example of a program of the compensator 4 with the considerations upon the speed control performance when running under the steady-state condition, the operation of which will be explained below.

Step 41: Command signal input step

The command signal Sw is inputted. In a general VCR, the command signal is generated in the system control unit in response to a signal key-inputted. When Sw="L", the stopping command signal is generated to carry out the operation of Step 42, and when Sw="H", the running command signal is generated to carry out the operation of Step 43.

Step 42: Stopping command signal generation step

The control signal Y for stopping the motor is generated, which corresponds to the torque-off condition (Y←0). Then, the control signal Y thus generated is sent to the D/A converter 7 to be converted into a DC voltage signal (control signal) in response to the value of the signal Y. Thereafter, the operation of Step 41 is carried out.

Step 43: Time measuring step

The time Tw (detection timing signal) determined by the reference rotational speed is set in the timer (t←Tw). In general, this time Tw is set in the timer so as to be more than twice the time interval at which the rotational speed of the motor is detected when the motor is being rotated at the reference speed. And, the output signal q of the flip-flop circuit t5 of the speed detector 3 is inputted until the signal q becomes an "H" level. Namely, the speed detector 3 detects the half period of the AC signal a of the speed detector 3 to monitor that a new digital signal b has been outputted. During that time, the timer is operated (t←t−1), and when the signal q does not become an "H" level before obtaining t=0, the operation of Step 44 is carried out, and when the signal becomes an "H" level before t=0, the operation of Step 46 is carried out.

Step 44: Control signal renewal step

The control signal Y outputted at the preceding running time is changed by a value of Ystep (Y←Y+Ystep). For example, suppose that the control signal is changed through the command unit from the stopping command one to the running command one and Y←Ystep is provided after the time Tw has passed. Here, the polarity of Ystep is selected so as to generate such a control signal Y that accelerates the rotation of the motor.

Furthermore, the control signal Y is sent to the D/A converter 7 to be converted into a DC voltage signal (control signal) in response to the value of the signal Y.

Step 45: Initial value generation step of integrated signal

The initial value of an integrated signal is generated in response to the memory value M2 stored through the operation of Step 49 (the details of which will be shown later) during the preceding steady-state running period of time (namely, when the operations of Steps 41, 43, 46, 47, 48 and 49 are repeated)(Int←1/h .M2: where h is a constant determined depending on a frequency bandwidth having an integral compensation effect and the speed detection period when running under the steady-state condition).

The initial value of the integrated signal generated at this step is employed in the operation of Step 47 when the next speed detection is made. Thereafter, it is fed back to the operation of Step 41.

Just after the command signal Sw was changed in level from "L" to "H", namely, when starting the motor, the torque-up operations of Steps 43 to 45 are repeated in a step-by-step manner. Then, if the motor is started to be rotated and the speed detection could be made, Step 46 and the following steps are operated. In addition, the initial value of the integrated signal is generated in response to the memory value stored through the preceding steady-state running operation.

Step 46: Rotation error calculation step

The digital signal b of the speed detector 3 is read to obtain the speed detected value S (digital value) in response to the digital signal b, and at the same time, the reset signal r is made an "H" level for a predetermined period of time to reset the counter circuit 14 and the flip-flop circuit 15 of speed detector 3. The speed detected value S is subtracted from the predetermined reference value Sref and the value thus obtained is multiplied by a factor R (R is a specific positive constant); thus, the rotation error E at the present time point of the motor 1 is calculated (E=R.(Sref-S)).

Step 47: Integrator (control signal generation step)

The rotation error E is subjected to an integration operation to generate the integrated signal Int (Int←Int+E). In this case, however, the initial value of the integrated signal Int is generated through the operation of Step 45.

Step 48: Control signal generation step

To the rotation error E is added a signal in response to the integrated signal Int as an adding signal to generate the control signal Y (Y←E+h.Int). Namely, the integral compensation is operated. Here, if the cut-off frequency of the integral compensation is expressed by f1 [Hz] and the speed detection period when running under the steady-state condition is expressed by Ts [sec], the constant h may be given as $$h = 2\pi \cdot f1 \cdot Ts$$

The control signal Y is supplied to the D/A converter 7 to be converted into a DC voltage signal (control signal) in response to the value of the signal Y.

Step 49: Memory step

The control signal Y is stored as a memory value thereof (M2←Y). The memory value stored at this step is employed in order to generate the initial value of the integrated signal at the next running time after stopping operation. It is fed back to the operation of Step 41.

With the structure as shown above, effective improvement of control characteristic due to integral compensation can be obtained while the stability of speed preceding when stating the motor is being maintained as in the concrete examples shown above. That is, the same effect that the pulling characteristic of integral compensation is largely improved can be obtained.

FIG. 7 shows an example of another program having the same effects as those of the example shown in FIG. 6. In FIG. 7, however, what is different from those shown in FIG. 6 are that the operation of Step 45 is changed to the operation of Step 45' and the operation of Step 49 is changed to the operation of Step 49', respectively. The operation thereof will be explained below.

Step 45': Initial value generation step of integral signal

The initial value of the integrated signal is generated in response to the memory value M3 stored through the operation of Step 49' (the details of which will be shown later) during the preceding steady-state running time period (namely, when the operations of steps 41, 43, 46, 47, 48, and 49' are repeated) (Int←M3).

The initial value of the integrated signal obtained at this step is employed in the operation of Step 47 when the next speed detection is made. Thereafter, it is fed back to the operation of Step 41.

Step 49': Memory step

The integrated signal Int is stored as a memory value (M3←Int). The memory value stored at this step is employed as the initial value of the integrated signal at the next running time after stopping operation. Thereafter, it is fed back to the operation of Step 41.

in the examples shown in FIGS. 6 and 7, the operation of the memory step is carried out each time that the speed detected signal is received and the operation of the initial value generation step of the integrated signal is carried out each time that the control signal is generated through the operation of the control signal renewal step, however, it may be carried out at such a timing that the control signal or the integrated signal under the steady-state condition during the preceding running operation is stored in the memory and the initial value of the integrated signal after speed detection is generated in response to the value thus stored, being needless to say that such case is within the scope of this invention.

Figure 8:
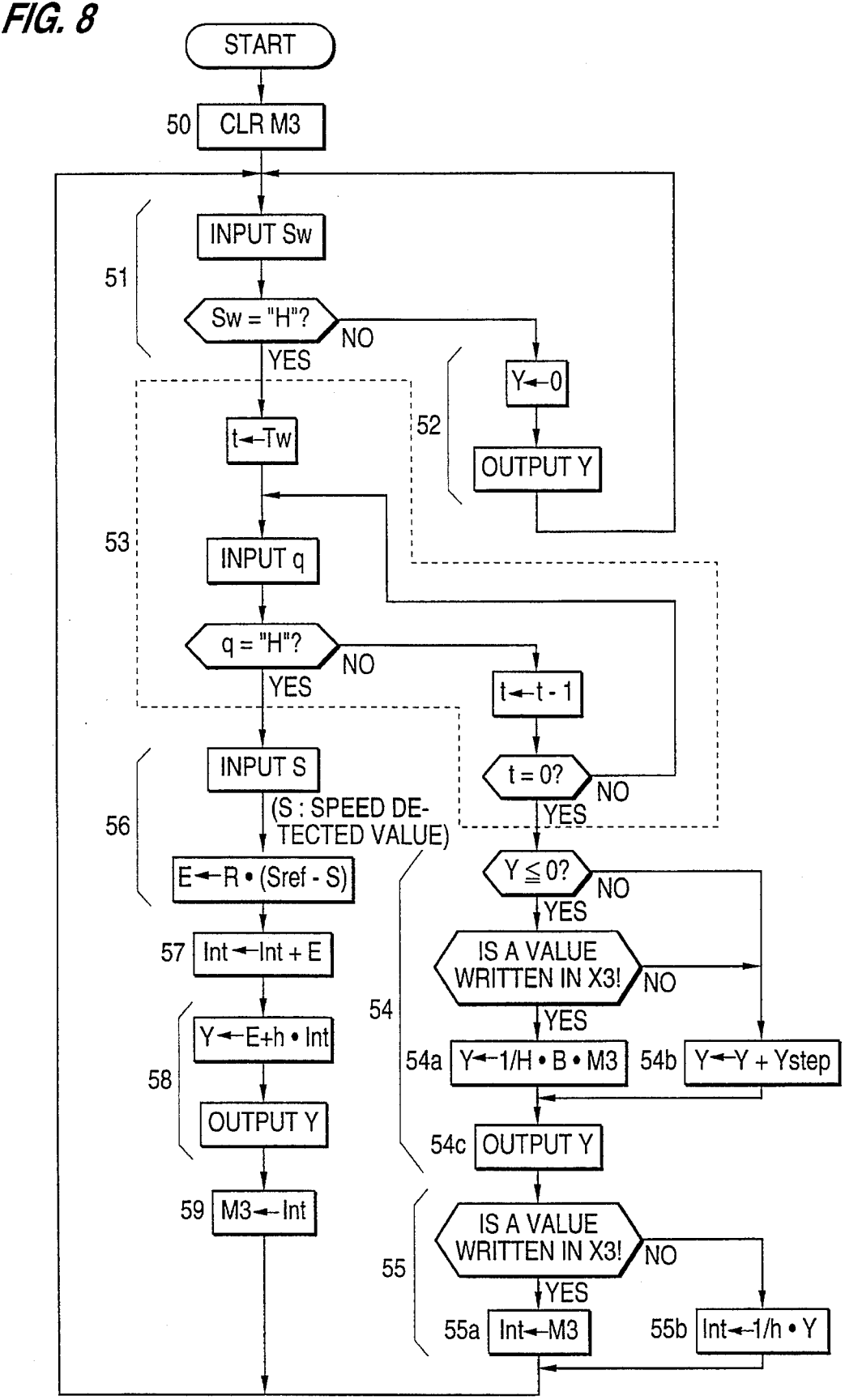
FIG. 8 is a flowchart showing another example of a program built in the compensator of this invention.

FIG. 8 shows another example of a program of the compensator 4 which is further adapted to be realized. The operation thereof will be explained below.

Step 50: Initial condition setting step

A memory M3 is cleared. The detailed explanation of the memory M3 occurs later.

Step 51: command signal input step

The command signal Sw is inputted. In a general VCR, the command signal is generated in the system control unit in response to a signal key-inputted. When Sw="L", the stopping command signal is generated to carry out the operation of Step 52, and when Sw="H", the running command signal is generated to carry out the operation of Step 53.

Step 52: Stopping signal generation step

The control signal Y for stopping the motor is generated, which is corresponded to the torque-off condition (Y←0). Then, the control signal Y is sent to the D/A converted 7 to be converted into a DC voltage signal (control signal) in response to the value of the signal Y. Thereafter, the operation of Step 51 is carried out.

Step 53: Time measuring step

The time Tw (detection timing signal) determined by the reference rotational speed is set in the timer (t←Tw). In general, this time Tw is set in the timer so as to be more than twice the time interval at which the rotational speed of the motor is detected when the motor is being rotated at the reference speed. And, the output signal q of the flip-flop circuit 15 of the speed detector 3 is inputted that until the signal q becomes "H" level. Namely, the speed detector 3 detects the half period of the AC signal a to monitor that a new digital signal b has been outputted. During that time, the timer is operated (t←t−1), and when the signal q does not become "H" before t= 0, the operation of Step 54 is carried out, and when it becomes "H" before obtaining t=0, the operation of Step 56 is carried out.

Step 54: Control signal renewal step

This step is different in processing depending on the value of the control signal Y outputted at the preceding time. If the value of the control signal Y outputted at the preceding time is not Y≦0, the operation of Step 54b is carried out. In addition, even if Y≦0, if no value is written in the memory M3, the operation of Step 54b is carried out. Further in addition, if Y≦0 and the memory M3 has a value stored, the operation of Step 54a is carried out. In this example, writing a value in the memory M3 is performed through the operation of Step 59 which will be shown later. The operation of Step 59 is the operation to be carried out when the speed detection could be made, namely, the fact that a value is stored in the memory M3 means that the steady-state running operation had been made before the operation of Step 54 is carried out. On the other hand, the fact that no value is stored in the memory M3 means that the motor is started for the first time after the control apparatus of this invention is set. In addition, the method of judging whether or not a value is written in the memory M3 is not explained in detail because it is not part of this invention. As an example, a method is known in which a variable for judging whether or not a value is stored in the memory M3 is introduced (expressed by j in this example); the variable j is made zero (0) through the operation of Step 50 (j←0), and a value is stored in the memory M3 and the variable j is made one (1) through the operation of Step 59 (j←1), thus determining whether the variable j is zero (0) or one (1). In this case, if j=0, no value is stored in the memory M3, and if j=1, a value is stored in the memory M3. Other than this, various methods may be used.

Step 54a: Initial value generation step of control signal

The operation of Step 54a is carried out in the case that the steady-state running operation had been made previously, then stopped once and the running command signal (Sw="H") is just outputted. Before the operation of Step 54a is carried out, the operations of steps 51 and 52 had been repeated. Namely, as the control signal Y, Y←0 is provided.

Here, the initial value of the control signal Y is generated in response to the value of the memory stored through the operation of Step 59 (Y←1/h.βM3), where the constant h is determined depending on the frequency bandwidth having an effect of integral compensation and the speed detection period when running under the steady-state condition, and β is a specific constant as well. It may be general that β=1. In addition, the operation of Step 54c is carried out successively.

Step 54b: Control signal renewal step

The control signal Y outputted at the preceding time is changed by a specific value Ystep (Y←Y+Ystep).

Step 54c: Control signal output step

The control signal Y is sent to the D/A converter 7 to be converted into a DC voltage signal (control signal) in response to the value of the signal Y.

Step 55: Initial value generation step of integrated signal

If no value is written in the memory M3, the operation of Step 55b is carried out. If a value is stored in the memory M3, the operation of Step 55a is carried out.

Step 55a: Initial value generation step of integrated signal from memory value The initial value of the integrated signal is generated in response to the memory value M3 stored through the operation of Step 59 (the details of which will be shown latter) during the preceding steady-state running time period (namely, when the operations of Steps 51, 53, 56, 57, 58 and 59 are repeated) (Int←M3).

The initial value of the integrated signal generated at this step is employed in the operation of Step 57 when the next speed detection is made. Thereafter, it is fed back to the operation of Step 51.

Step 55b: Initial value generation step of integrated signal from control signal The initial value of the integrated signal is generated in response to the value of the constant signal Y generated at the control signal renewal step (Int←1/h.Y).

The initial value of the integrated signal thus formed is employed in the operation of Step 57 when the next speed detection could be made. Thereafter, it is fed back to the operation of Step 51.

Figure 9A:
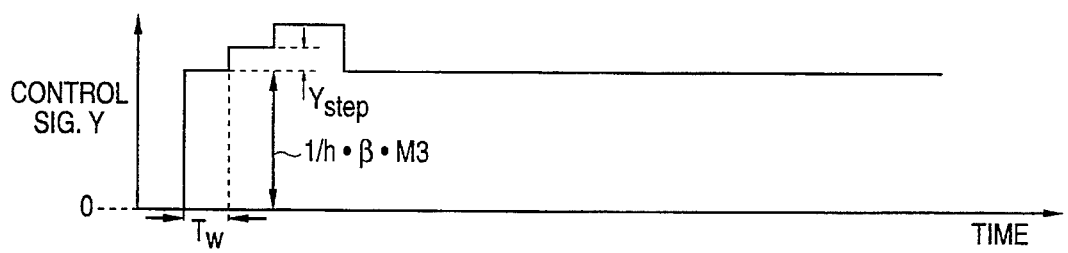
FIG. 9(a) is a diagram showing the change of an output of a control signal of a compensator with time according to one embodiment of this invention.
Figure 9B:
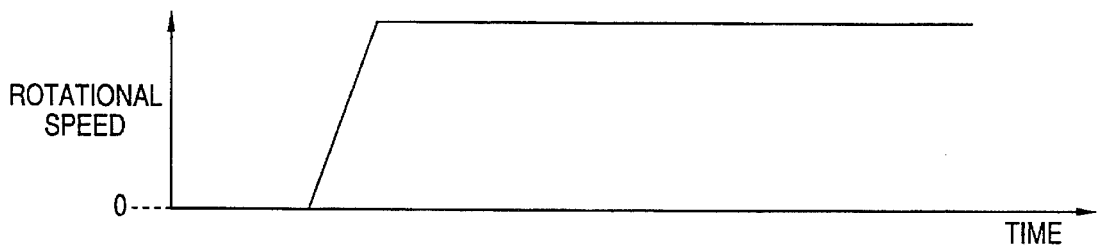
FIG. 9(b) is a diagram showing the change of a rotational speed of a motor with time according to one embodiment of this invention.

Just after the command signal Sw is changed in level from "L" to "H", namely, when starting the motor, the torque-up operations of Steps 53 to 55 are repeated in a step-by-step manner. In this case, however, when a value is stored in the memory M3, namely, in the case that the motor had been run at least one or more times previously, the torque is increased with a value in response to the value stored in the memory M3 as the initial value. The changes of the control signal and the rotational speed of the motor with a change in time are shown in FIG. 9.

Then, if the motor is started to be rotated and the speed detection could be made, the operations of Step 56 and the following steps are carried out.

Step 56: Rotation error calculation step

At this step, the digital signal b of the speed detector 3 is read to obtain a speed detected value S (digital value) in response to the digital signal b, and at the same time, the reset signal r is made "H" level for a predetermined period of time to reset the counter circuit 14 and the flip-flop circuit 15 of the speed detector 3. The speed detected value S is subtracted from the predetermined reference value Sref and the value thus obtained is multiplied by a factor R (R is a specific positive constant); thus, the rotation error E at the present time point of the motor 1 is calculated (E=R.(Sref-S)).

Step 57: Control signal generation step

The rotation error E is subjected to an integration operation to generate the integrated signal Int (Int←Int+E). In this case, however, the initial value of the integrated signal Int is generated through the operation of Step 55.

Step 58: Control signal generation step

To the rotation error E is added a value in response to the integrated signal Int as the adding signal to generate the control signal Y (Y←E+h.Int). Namely, an integral compensation is carried out. Here, if the cut-off frequency of the integral compensation is expressed by f1 [Hz] and the speed detection period when running under the steady-state condition is expressed by Ts [sec], the constant h can be given as $h=2\pi f1.Ts$ Then, the control signal Y is sent to the D/A converter 7 to be converted into a DC voltage signal (control signal).

Step 59: Memory step

The integrated signal Int is stored as the memory value (M3←Int). The memory value thus stored is employed in order to generate the initial value of the integrated signal Int at the next running time after stopping operation. Thereafter, it is fed back to the operation of Step 51.

With the structure as explained above, the motor can be stated stably even when first started, and when started for the second or more time, it can be provided with further stable characteristics, and yet, the time required for starting can be vastly reduced.

According to this embodiment, when the motor is to be started for the second or more time, the initial value is set to the control signal in response to the memory value M3 stored during the preceding steady-state running time period and outputted. In this memory M3, the integrated signal at the preceding steady-state running time is written. By changing the value M3 in terms of a gain (h) of the integral compensation (x 1/h), a value that corresponds to the steady-state load torque can be obtained. As a result, this means that the value which corresponds to the steady-state load torque at the preceding time of running is outputted as the initial value of the control signal. It is known, in general, that a steady-state load torque is smaller than a starting load torque. As a result, by structuring as shown above, even if the initial value is set to the control signal to be outputted in the second or more time of starting, no effect on the stability of starting performance results. In addition, the time required to search the starting torque can be reduced, so that the time required for starting can be decreased.

Further in addition, according to this embodiment, the initial value of the control signal and the initial value of the integrated signal are changed depending on the fact whether or not a value is stored in the memory M3 or not, however, other applicable examples can be considered. For example, the case that it is estimated in advance that the steady-state load is largely changed between the preceding running time and the running time after starting next to the preceding running operational will be explained below. In this case, such a method can be considered that in the operation of Step 54a, or initial value generation step of control signal, any other value than one (1) is set as the value β. When it is estimated that the load becomes larger than that at the preceding running time, a value of which is larger than one (1) may be set as the value of β, and when it is estimated that the load becomes smaller than that at the preceding running time, a value which is smaller than one (1) may be set as the value of β. In addition, in the operation of Step 55, or initial value generation step of integrated signal, it is preferable to set as shown at Step 55, whether or not a value is stored in the memory M3, it being needless to say that such cases are all with the scope of this invention.

In this embodiment, the explanations were made such that the operation of the integrator is to be carried out just after generating the rotation error; however, it is not limited thereto, and it may be carried out after the control signal Y was sent to the D/A converter 7.

Furthermore, in this embodiment, the explanations were made such that the speed detector detects only the rotational speed of the motor, however, additionally to rotational speed detection, the rotational phase of the motor can be detected by a known phase detector, and both detection results may be combined to be used as the rotation error, which are needless to say to be contained in the scope of this invention. In addition, the output signal of the compensator may be formed as a digital signal or pulse width modulation (PWM) signal, or the output signal of the electric power amplifier may be formed as PWM signal. Further in addition, a brushless motor may be used as the motor of this invention. Still further in addition, the compensator may be structured as hardware, thereby carrying out the same operations as those of the above-mentioned programs. Also, various modifications can be made without changing the object of this invention.

What is claimed is:

1. A control apparatus for controlling a motor comprising:
  a command means for generating a command signal including a running command signal and a stopping command signal;
  a rotation sensor means for generating an AC signal having a period corresponding to a rotational speed of said motor;
  a speed detection means for detecting the rotational speed of said motor from the AC signal generated by said rotation sensor means and for outputting a detected signal indicating the detected rotational speed and another detected signal;
  a compensation means for generating a control signal for controlling said motor; and
  a driver means for driving said motor in response to the control signal generated by said compensation means;
  said compensation means comprising:
  a stopping signal generating means for generating a signal to stop said motor when the command signal from said command means is the stopping command signal;
  a time measuring means for generating a detection timing signal at predetermined time intervals until the another detected signal from said speed detection means becomes a predetermined level after the command signal from said command means has been switched from the stopping command signal to the running command signal;
  a control signal renewal means for changing said control signal by a predetermined amount in response to the detection timing signal from said time measuring means to renew said control signal in a step-by-step manner when said time measuring means is generating the detection timing signal, and
  a control signal generating means operable when the detected signal from said speed detection means is inputted thereto for generating said control signal in response to the detected signal from said speed detection means, said control signal generating means using an output of said control signal renewal means as an initial value of said control signal.

2. A control apparatus for controlling a motor comprising:
  a command means for generating a command signal including a running command signal and a stopping command signal;
  a rotation sensor means for generating an AC signal having a period corresponding to a rotational speed of said motor;
  a speed detection means for detecting a rotational speed of said motor from the AC signal of said rotation sensor means and for outputting a detected signal indicating the detected rotational speed and another detected signal;
  a compensation means for generating a control signal for controlling said motor; and
  a driver means for driving said motor in response to the control signal generated by said compensation means;
  said compensation means comprising:
  a stopping signal generating means for generating a signal to stop said motor when the command signal from said command means is the stopping command signal;
  a time measuring means for generating a detection timing signal at predetermined time intervals until the another detected signal from said speed detection means becomes a predetermined level after the command signal from said command means has been switched from the stopping command signal to the running command signal;
  a control signal renewal means for changing said control signal by a predetermined amount in response to the detection timing signal from said time measuring means to generate a new control signal;
  a rotation error generating means for generating a rotation error between a reference value and a speed detected value corresponding to the detected signal from said speed detection means; and
  a control signal generating means for generating said control signal by adding a predetermined adding signal to said rotation error;
  whereby after the command signal from said command means has been switched from the stopping command signal to the running command signal, if the another detected signal from said speed detection means does not become the predetermined level, said control signal is changed at predetermined time intervals in a step-by-step manner by said time measuring means and said control signal renewal means, and if the another detected signal from said speed detection means becomes the predetermined level, and rotation error generating means and said control signal generating means are operated to add the rotation error generated by said rotation error generating means to said predetermined adding signal so as to thereby generate said control signal.

3. A control apparatus according to claim 2, wherein said compensation means has a first memory in which a value in response to the control signal from said control signal renewal means is stored as a first memory value, and the predetermined adding signal to be added to the rotation error by said control signal generating means is said first memory value.

4. A control apparatus according to claim 2, wherein said compensation means has a first memory in which a value in response to the control signal from said control signal renewal means is stored as a first memory value, and said control signal generating means has integrator means for integrating the rotation error from said rotation error generation means with a value in response to said first memory value as an initial value thereof and outputting an integrated signal, and the predetermined adding signal to be added to the rotation error is a value in response to the integrated signal from said integrator means.

5. A control apparatus for controlling a motor having a running operation and stopping operation interatively switched, said control apparatus comprising:

- a command means for generating a command signal including a running command signal and a stopping command signal;
- a rotation sensor means for generating an AC signal having a period corresponding to a rotational speed of said motor;
- a speed detection means for detecting a rotational speed of said motor from the AC signal generated by said rotation sensor means and for outputting a detected signal indicating the detected rotational speed and another detected signal;
- a compensation means for generating a control signal for controlling said motor; and
- a driver means for driving said motor in response to the control signal generated by said compensation means;

said compensation means comprising:

- a stopping signal generating means for generating a signal to stop said motor when the command signal from said command means is the stopping command signal;
- a time measuring means for generating a detection timing signal at predetermined time intervals until the another detected signal from said speed detection means becomes a predetermined level after the command signal from said command means has been switched from the stopping command signal to the running command signal;
- a control signal renewal means for changing said control signal by a predetermined amount in response to the detection timing signal from said time measuring means to generate a new control signal;
- a rotation error generating means for generating a rotation error between a reference value and a speed detected value corresponding to the detected signal from said speed detection means;
- a control signal generating means for generating said control signal by adding a predetermined adding signal to said rotation error; and
- a second memory in which a value in response to a control signal generated by said control signal generating means is stored as a second memory value;
- wherein the predetermined adding signal added in response to the rotation error by said control signal generating means having a value in response to the second memory value stored when the command signal generated by said command means is the running command signal at the preceding time;
- whereby after the command signal generated by said command means has been switched from the stopping command signal to the running command signal, if the another detected signal from said speed detection means does not become the predetermined level, said control signal is changed at predetermined time intervals in a step-by-step manner by said time measuring means and said control signal renewal, means, and if the another detected signal from said speed detection means becomes the predetermined level, said rotation error generating means and said control signal generating means are operated to add the rotation error generated by said rotation error generating means to said predetermined adding signal so as to thereby generate said control signal.

6. A control apparatus according to claim 5, wherein said control signal generating means comprises an integrator means for integrating the rotation error generated by said rotation error generating means with a value in response to the second memory value stored when the command signal generated by said command means is the running command signal at the preceding time as an initial value thereof and outputting an integrated signal, and the predetermined adding signal to be added to the rotation error is a value in response to the integrated signal from said integrator means.

7. A control apparatus according to claim 5, wherein after the command signal generated by said command means has been switched from the stopping command signal to the running command signal, if the another detected signal from said speed detection means does not become the predetermined level for a predetermined time period, said control signal renewal means outputs a value in response to the second memory value stored when said command signal is the running command signal at the preceding time as the control signal thereof, then, if the another detected signal from said speed detection means does not become the predetermined level successively, said control signal is changed at predetermined time intervals in a step-by-step manner by said time measuring means and said control signal renewal means, and if the another detected signal from said speed detection means becomes the predetermined level said rotation error generating means and said control signal generating means are operated to generated said control signal.

8. A control apparatus for controlling a motor having a running operation and stopping operation iteratively switched, said control apparatus comprising:

- a command means for generating a command signal including a running command signal and a stopping command signal;
- a rotation sensor means for generating an AC signal having a period corresponding to a rotational speed of said motor;
- a speed detection means for detecting a rotational speed of said motor from the AC signal generated by said rotation sensor means and outputting a detected signal indicating the detected rotational speed and another detected signal;
- a compensation means for generating a control signal for controlling said motor; and
- a driver means for deriving said motor in response to the control signal generated by said compensation means;

said compensation means comprising:

stopping signal generating means for generating a signal to stop said motor when the command signal from said command means is the stopping command signal;

- a time measuring means for generating a detection timing signal at predetermined time interval until the another detected signal from said speed detection means becomes a predetermined level after the command signal from said command means has been switched from the stopping command signal to the running command signal;
- a control signal renewal means for changing said control signal by a predetermined amount in response to the detection timing signal from said time measuring means hereby to generate a new control signal;

a rotation error generating means for generating a rotation error between a reference value the detected signal from said speed detection means;

an integrator means for integrating the rotation error from said rotation error generating means to generate an integrated signal;

a third memory for storing a value in response to the integrated signal from said integrator means as a third memory value; and a control signal generating means for generating said control signal by adding a value in response to the integrated signal from said integrator means to said rotation error, said integrator means integrating said rotation error with a value in response to said third memory value stored when the command signal from said command means is the running command signal at the preceding time as an initial value thereof thereby to generate the integrated signal;

whereby after the command signal from said command means has been switched from the stopping command signal to the running command signal, if the another detected signal from said speed detection means does not become the predetermined level, said control signal is changed at predetermined time intervals in a step-by-step manner by said time measuring means and said control signal renewal means, and if the another detected signal from said speed detection means becomes the predetermined level, said rotation error generating means, said integrator means and said control signal generating means are operated to add the rotation error from said rotation error generating means to a value in response to the integrated signal from said integrator means to generate said control signal.

9. A control apparatus according to claim 8, wherein after the command signal from said command means has been switched from the stopping command signal to the running command signal, if the another detecting signal from said speed detection means does not become the predetermined level for a predetermined time period, said control signal renewal means outputs a value in response to the third memory value stored when said command signal is the running command signal at the preceding time as the control signal thereof, then, if the another detected signal from said speed detection means does not become the predetermined level successively, said control signal is changed at predetermined time intervals in a step-by-step manner by said time measuring means and said control signal renewal means, and if the another detected signal from said speed detection means becomes the predetermined level, said rotation error generating means, said integrator means and said control signal generating means are operated to generate said control signal.

10. A control apparatus for controlling a motor comprising:

a command means for generating a command signal including a running command signal and a stopping command signal;

a rotation sensor means for generating an AC signal having a period corresponding to a rotational speed of said motor;

a speed detection means for detecting the rotational speed of said motor from the AC signal generated by said rotation sensor means and outputting a detected signal indicating the detected rotational speed and another detected signal;

a compensation means responsive to the command signal and the detected signal for generating a control signal for controlling said motor; and a driver means for driving said motor in response to the control signal generated by said compensation means;

wherein after the command signal from said command means has been switched from the stopping command signal to the running command signal, said compensation means changes said control signal at predetermined time intervals in a step-by-step manner if the another detected signal from said speed detection means does not become a predetermined level, and generates said control signal in response to the detected signal if the another detected signal from said speed detection means becomes the predetermined level.

* * * * *